s010424066B2

United States Patent
Ozawa

(10) Patent No.: US 10,424,066 B2
(45) Date of Patent: Sep. 24, 2019

(54) IMAGE ANALYZING APPARATUS THAT CORRECTS ISOLATED PIXELS IN TARGET IMAGE DATA

(71) Applicant: Brother Kogyo Kabushiki Kaisha, Nagoya-shi, Aichi-ken (JP)

(72) Inventor: Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 310 days.

(21) Appl. No.: 15/627,811

(22) Filed: Jun. 20, 2017

(65) Prior Publication Data

US 2018/0061061 A1    Mar. 1, 2018

(30) Foreign Application Priority Data

Aug. 31, 2016    (JP) .................................. 2016-169723

(51) Int. Cl.
 *G06K 9/34*    (2006.01)
 *G06T 7/12*    (2017.01)
 (Continued)

(52) U.S. Cl.
 CPC ................ *G06T 7/12* (2017.01); *G06T 5/002* (2013.01); *G06T 5/50* (2013.01); *G06T 7/0002* (2013.01);
 (Continued)

(58) Field of Classification Search
 None
 See application file for complete search history.

(56) References Cited

U.S. PATENT DOCUMENTS 6,154,575 A * 11/2000 Hashimoto ............... G06T 5/30
                                                      382/195
6,356,657 B1 * 3/2002 Takaoka ............. G06K 9/00463
                                                      382/173
(Continued)

FOREIGN PATENT DOCUMENTS

JP    H05-342411 A    12/1993
JP    H05-344335 A    12/1993
JP    08272956 A *    10/1996

OTHER PUBLICATIONS

Asano, "In-place algorithm for erasing a connected component in a binary image." Theory of Computing Systems 50, No. 1 (2012): 111-123. (Year: 2012).*

*Primary Examiner* — Feng Niu
(74) *Attorney, Agent, or Firm* — Banner & Witcoff, Ltd.

(57) ABSTRACT

Plural pieces of reference data are stored for plural pixel arrangement patterns. Each piece of reference data indicates which of first-type edge pixels needs to be subjected to determination to determine whether an outside neighboring first-type pixel adjacent to the first-type edge pixel exists. A piece of reference data corresponding to a target pixel block is specified as target reference data. A reference-data-based judgment is executed on the target pixel block to perform the determination onto those first-type edge pixels that are indicated by the target reference data as need to be subjected to the determination. A correction is executed on the target pixel block to correct the type of at least one first-type pixel contained in the target pixel block into the second type in a case where a result of the reference-data-based judgment indicates that no outside neighboring first-type pixel exists with respect to the target pixel block.

13 Claims, 9 Drawing Sheets

(51) Int. Cl.
    *G06T 7/136*     (2017.01)
    *G06T 5/00*      (2006.01)
    *G06T 5/50*      (2006.01)
    *G06T 7/00*      (2017.01)

(52) U.S. Cl.
    CPC .... *G06T 7/136* (2017.01); *G06T 2207/20021* (2013.01); *G06T 2207/20036* (2013.01)

(56) References Cited

U.S. PATENT DOCUMENTS

| | | | | |
|---|---|---|---|---|
| 6,477,282 | B1* | 11/2002 | Ohtsuki | G06T 3/4007 382/266 |
| 6,606,420 | B1* | 8/2003 | Loce | G06T 5/30 382/199 |
| 7,496,240 | B2* | 2/2009 | Hu | H04N 1/38 382/275 |
| 7,961,930 | B2* | 6/2011 | Prakash | G06K 9/40 382/100 |
| 8,339,677 | B2* | 12/2012 | Nakagata | G06T 5/006 358/3.26 |

\* cited by examiner

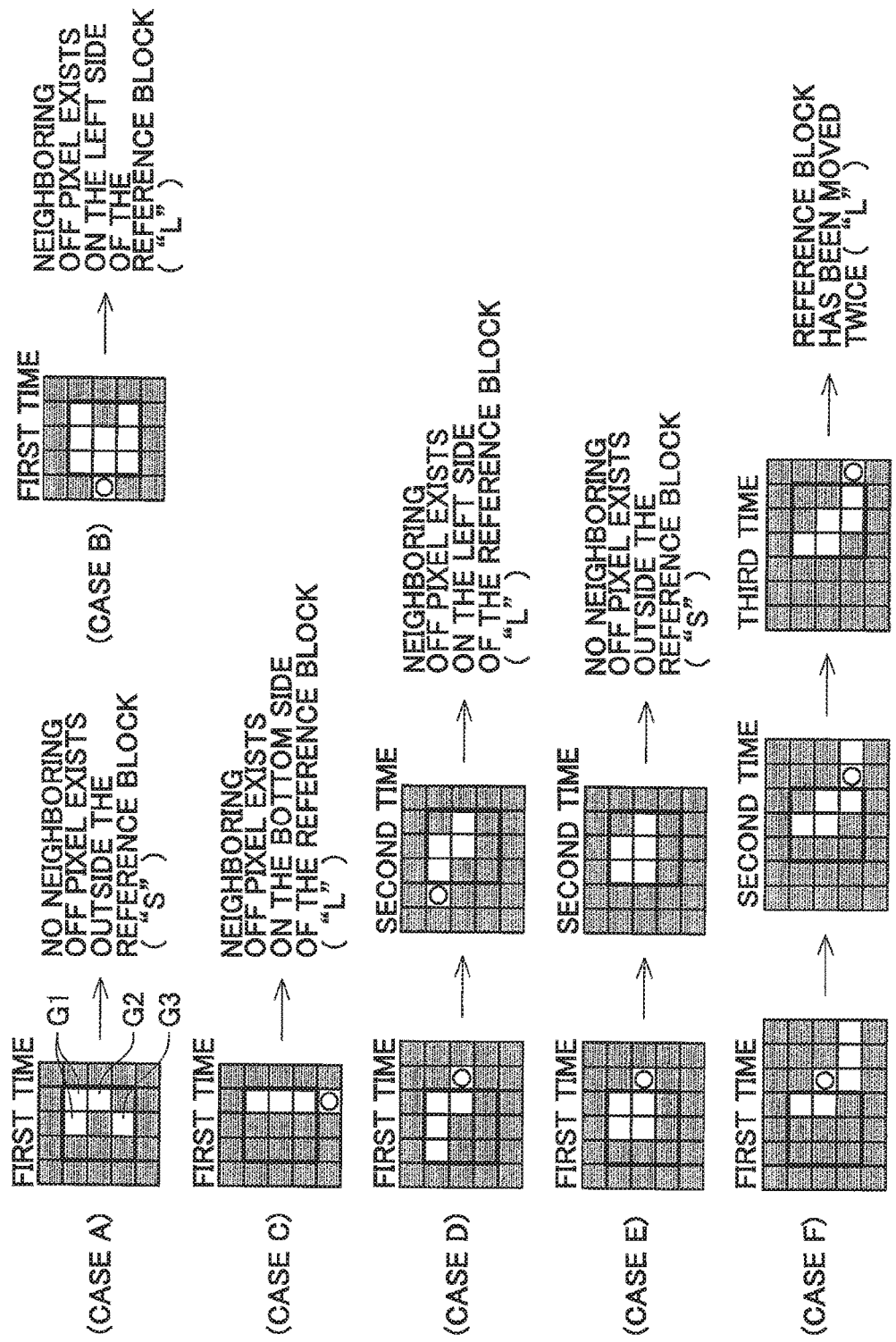

IMAGE ANALYZING APPARATUS THAT CORRECTS ISOLATED PIXELS IN TARGET IMAGE DATA

CROSS REFERENCE TO RELATED APPLICATION

This application claims priority from Japanese Patent Application No. 2016-169723 filed Aug. 31, 2016. The entire content of the priority application is incorporated herein by reference.

TECHNICAL FIELD

The present disclosure relates to an image analyzing apparatus for correcting a pixel of a first type into a pixel of a second type.

BACKGROUND

There has been proposed an image analyzing apparatus that receives an encoded input-sheet image data from a fax adapter and converts, to white pixels, those black pixels that do not neighbor other black pixels (isolated black pixels). Specifically, when the image analyzing apparatus detects a black pixel, the apparatus then checks the eight pixels surrounding the black pixel. The apparatus converts the black pixel to a white pixel when all eight surrounding pixels are white.

SUMMARY

The above-described conventional image analyzing apparatus needs to check all eight pixels surrounding the black pixel, in order to determine whether the black pixel is isolated. Consequently, this method requires a long period of time for converting isolated black pixels to white pixels.

It is therefore an object of the present disclosure to provide a technique for rapidly correcting a pixel of a first type to a pixel of a second type.

According to one aspect, an image analyzing apparatus includes: a memory; and a controller. The memory stores a plurality of pieces of reference data in correspondence with a plurality of pixel arrangement patterns, each pixel arrangement pattern being defined for a rectangular-shaped pixel block configured from (M×N) number of pixels arranged in N number of rows and M number of columns, each row extending in a first direction and each column extending in a second direction orthogonal to the first direction, wherein M and N are integers greater than or equal to two (2), the (M×N) number of pixels including L number of edge pixels disposed at an outer edge of the rectangular-shaped pixel block, wherein L is an integer satisfying an equation of L=(2×M)+(2×N)−4, each pixel arrangement pattern indicating how pixels of a first type and of a second type are arranged in the pixel block, the L number of edge pixels including at least one edge pixel of the first type, the piece of reference data for each pixel arrangement pattern indicating which of the edge pixels of the first type in the pixel block needs to be subjected to a determination to determine whether there exists an outside neighboring first-type pixel that is of the first type and is disposed outside the pixel block at a location adjacent to the edge pixel of the first type. The controller is configured to perform:

acquiring target image data that is generated by reading an original, the target image data being configured from a plurality of pixels arranged in a plurality of rows and a plurality of columns, each row extending in the first direction and each column extending in the second direction;

specifying, in the target image data, a rectangular-shaped target pixel block configured from the (M×N) number of pixels arranged in the N number of rows and the M number of columns, each row extending in the first direction and each column extending in the second direction; and analyzing the target pixel block. The analyzing the target pixel block includes:

specifying, as target reference data a piece of reference data that is among the plurality of pieces of reference data and that corresponds to a pixel arrangement pattern in the target pixel block;

executing a reference-data-based judgment on the target pixel block to perform the determination onto each of those edge pixels of the first type that are indicated by the target reference data as need to be subjected to the determination; and executing a correction on the target pixel block to correct the type of at least one pixel of the first type contained in the target pixel block into the second type in a case where a result of the executed reference-data-based judgment indicates that there exists no outside neighboring first-type pixel with respect to the target pixel block.

According to another aspect, a non-transitory computer readable storage medium stores a set of program instructions for an image analyzing apparatus. The image analyzing apparatus includes a memory and a processor. The memory stores a plurality of pieces of reference data in correspondence with a plurality of pixel arrangement patterns. each pixel arrangement pattern being defined for a rectangular-shaped pixel block configured from (M×N) number of pixels arranged in N number of rows and M number of columns, each row extending in a first direction and each column extending in a second direction orthogonal to the first direction, wherein M and N are integers greater than or equal to two (2), the (M×N) number of pixels including L number of edge pixels disposed at an outer edge of the rectangular-shaped pixel block, wherein L is an integer satisfying an equation of L=(2×M)+(2×N)−4, each pixel arrangement pattern indicating how pixels of a first type and of a second type are arranged in the pixel block, the L number of edge pixels including at least one edge pixel of the first type, the piece of reference data for each pixel arrangement pattern indicating which of the edge pixels of the first type in the pixel block needs to be subjected to a determination to determine whether there exists an outside neighboring first-type pixel that is of the first type and is disposed outside the pixel block at a location adjacent to the edge pixel of the first type. The program instructions, when executed by the processor, cause the image analyzing apparatus to perform:

acquiring target image data that is generated by reading an original, the target image data being configured from a plurality of pixels arranged in a plurality of rows and a plurality of columns, each row extending in the first direction and each column extending in the second direction;

specifying, in the target image data, a rectangular-shaped target pixel block configured from the (M×N) number of pixels arranged in the N number of rows and the M number of columns, each row extending in the first direction and each column extending in the second direction; and analyzing the target pixel block. The analyzing the target pixel block includes:

specifying, as target reference data, a piece of reference data that is among the plurality of pieces of reference data and that corresponds to a pixel arrangement pattern in the target pixel block;

executing a reference-data-based judgment on the target pixel block to perform the determination onto each of those edge pixels of the first type that are indicated by the target reference data as need to be subjected to the determination; and executing a correction on the target pixel block to correct the type of at least one pixel of the first type contained in the target pixel block into the second type in a case where a result of the executed reference-data-based judgment indicates that there exists no outside neighboring first-type pixel with respect to the target pixel block.

BRIEF DESCRIPTION OF THE DRAWINGS

The particular features and advantages of the disclosure will become apparent from the following description taken in connection with the accompanying drawings, in which:

FIG. 9 illustrates how neighboring determination is executed with respect to each of various exemplary cases.

DETAILED DESCRIPTION

Figure 1:
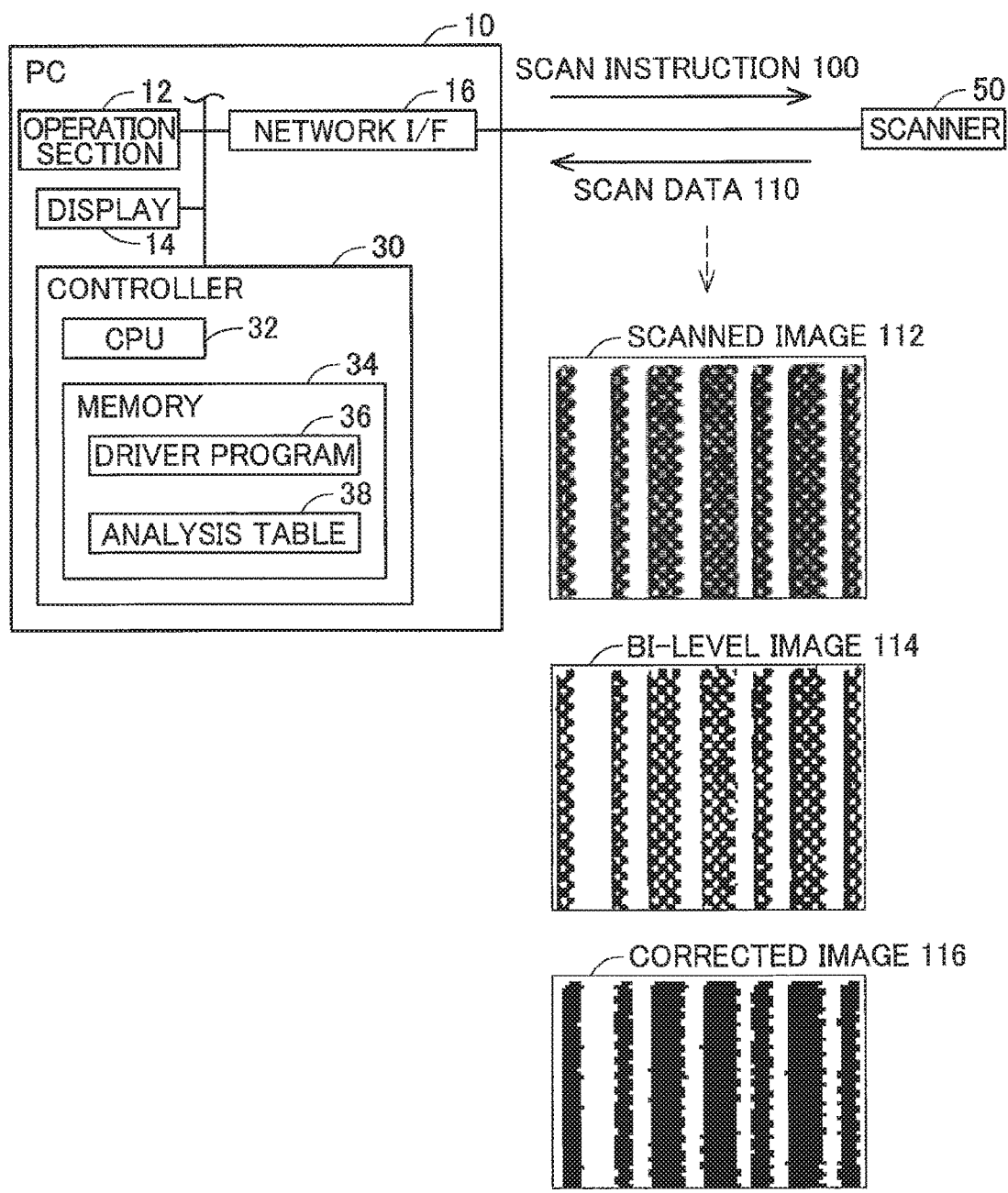
FIG. 1 shows a hardware configuration of a personal computer according to an embodiment, and shows an example of a scanned image, a bi-level image, and a corrected image.

An image analyzing apparatus according to an embodiment will be described while referring to the accompanying drawings wherein like parts and components are designated by the same reference numerals to avoid duplicating description.

Structure of a PC 10

As shown in FIG. 1, a personal computer (PC) 10 is connected to a scanner 50 via a local area network (LAN) and is capable of communicating with the scanner 50. The PC 10 includes an operation section 12, a display 14, a network interface 16, and a controller 30. The operation section 12 includes an operation interface such as a mouse, keyboard, and the like. By operating the operation section 12, the user can input various instructions into the PC 10. The display 14 is provided for displaying various types of information. The network interface 16 is connected to the LAN.

The controller 30 includes a CPU 32 and a memory section 34. The memory section 34 is configured of read-only memory (ROM), random access memory (RAM), and the like. The CPU 32 is a processor that executes various processes, such as a process of FIG. 2 to be described later, for example, based on various programs stored in the memory section 34. These programs include an operating system (OS; not shown), a driver program 36, and the like. The memory section 34 also stores an analysis table 38 described later.

The driver program 36 is a program provided by the vendor of the scanner 50 for executing processes related to the scanner 50. The user of the PC 10 may install the driver program 36 on the PC 10 from media shipped together with the scanner 50 or from a server on the Internet provided by the vendor of the scanner 50.

When the user performs an operation on the operation section 12 to execute a scan, the CPU 32 receives the scan execution operation and transmits a scan instruction 100 to the scanner 50 prompting the scanner 50 to read an original. The scan instruction 100 includes read settings, such as the reading resolution and the size of the original to be read. In response, the scanner 50 reads the original based on the read settings and generates scan data 110. The scanner 50 then supplies the scan data 110 to the PC 10. As a result, the CPU 32 acquires the scan data 110 from the scanner 50.

The CPU 32 may also receive a decoding operation from the user instructing the CPU 32 to decode a one-dimensional barcode included on the original. The one-dimensional barcode represents a combination of characters, symbols, and the like with a plurality of bars. Examples of originals that include a one-dimensional barcode are office documents and medical charts. The one-dimensional barcode on an office document, for example, corresponds to characters, symbols, and the like that identify the destination folder, in which the scan data representing the document should be stored. When the CPU 32 receives the decoding operation described above and acquires the scan data 110, the CPU 32 decodes the barcode image in a scanned image 112 represented by the scan data 110 according to the driver program 36. Next, the CPU 32 executes a process based on the decoding results. For example, the CPU 32 may store the scan data 110 in a folder in the memory section 34 specified by the decoding results. Note that although FIG. 1 shows that the scanned image 112 includes a barcode image only, the scanned image 112 actually includes other images (text, photos, and diagrams, for example) in addition to the barcode image.

According to the embodiment, in order to accurately decode the barcode image, the CPU 32 generates a bi-level image 114 from the scanned image 112, corrects the bi-level image 114 to produce a corrected image 116, and decodes the barcode image in the corrected image 116. This correction is effective when the scanner 50 scans the following type of original. In an original generated by a printing process including a halftone process employing the dither method, each bar configuring the barcode can be rendered with deposition areas and non-deposition areas that are arranged in a matrix, wherein each deposition area is formed by depositing printing material, and each non-deposition area is formed by depositing no printing material. When the scanner 50 executes a reading operation on this type of original to generate a scanned image 112, the barcode image in the scanned image 112 includes pixels corresponding to the deposition areas (i.e., pixels rendered in black in FIG. 1) and pixels corresponding to the non-deposition areas (i.e., pixels rendered in white) that are juxtaposed in a matrix. In this case, the CPU 32 will possibly become incapable of determining the thickness of each bar reliably when decoding the barcode image. This possibility may increase particularly when the original was printed in grayscale or by laser printing. In the embodiment, the CPU 32 generates the corrected image 116 by correcting the barcode image in the bi-level image 114 to convert pixels rendered in white to pixels rendered in black. As a result, the CPU 32 can reliably identify the thickness of each bar in the barcode image included in the corrected image 116. As variations of this process, examples of the original to be read may include: an original produced by a printing operation that includes a halftone process using the error diffusion method; an original produced through color printing; and an original produced through inkjet printing.

Process According to the Driver Program 36 of the PC 10

Next will be described with reference to FIG. 2 the contents of a driver process that the CPU 32 executes upon receiving the decoding operation described above. The driver process is executed based on the driver program 36.

In S10, the CPU 32 first acquires the scan data 110 from the scanner 50 via the network interface 16. The scan data 110 represents the scanned image 112. The scan data 110 is configured of a plurality of pixels arranged two dimensionally in rows and columns, each row extending in the x-direction (i.e., the leftward/rightward direction in the scanned image 112) and each column extending in the y-direction (i.e., the upward/downward direction in the scanned image 112). Each pixel specifies pixel values (specifically an R value, G value, and B value). Each pixel value is in one of 256 gradations (i.e., from 0 to 255). In the embodiment, it will be assumed that the scanner 50 generates the scan data 110 by reading an original at the reading resolution of 100 dpi.

In S12, the CPU 32 executes a luminance conversion process on the scan data 110. Specifically, the CPU 32 converts the pixel values (R, G, and B values) for each pixel in the scan data 110 to a luminance value (the Y value) by using the following equation to generate a new pixel that specifies the luminance value in one of 256 gradations from 0 to 255:

$$Y=0.299\times R+0.587\times G+0.114\times B.$$

Through this process, the CPU 32 generates luminance image data configured of a plurality of pixels, each pixel specifying a luminance value. In the embodiment, the original being read has a white background (i.e., R=G=B=255). Hence, the luminance value (Y value) specifying the background of the original is normally 255, and luminance values specifying non-background areas in the original are normally less than 255.

Figure 3:
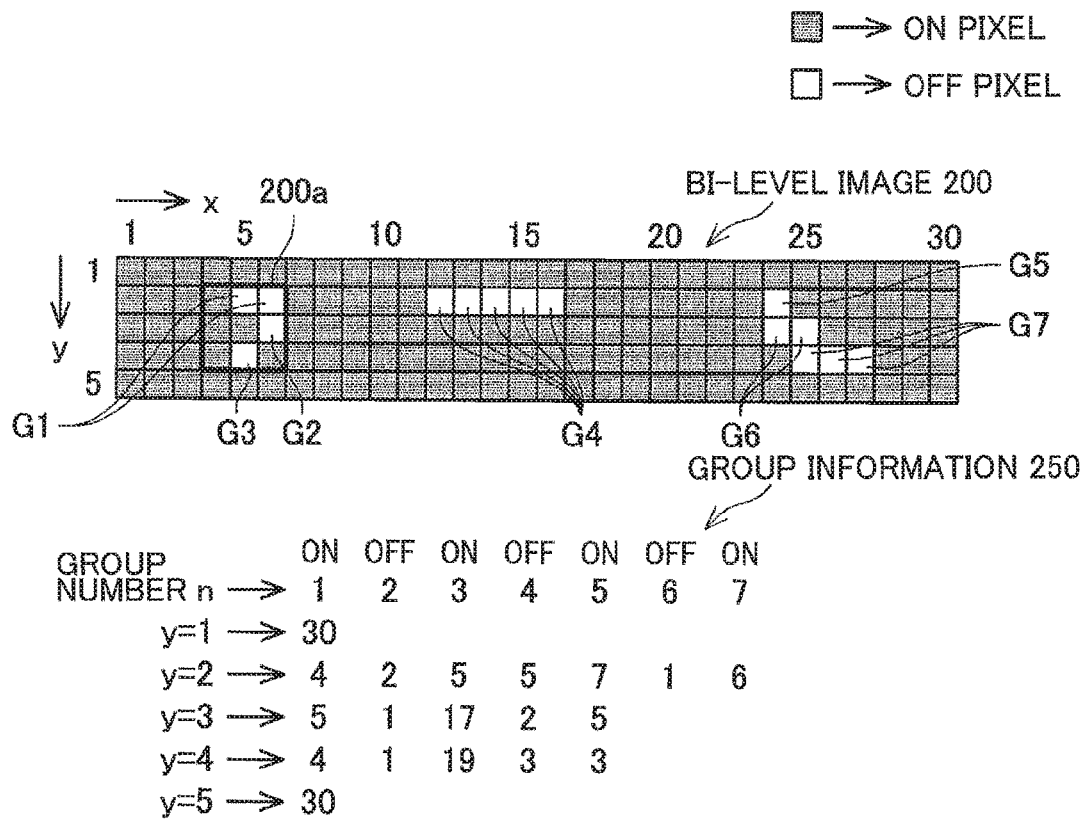
FIG. 3 shows an example of part of the bi-level image, group information, and part of the corrected image.

In S14, the CPU 32 executes a thresholding process on the luminance image data generated in S12. Specifically, the CPU 32 converts the luminance value specified by each pixel in the luminance image data to a value "1" or "0" to generate a new pixel specifying a value of "1" or "0". More specifically, the CPU 32 generates a pixel specifying a value "1" when the luminance value is no greater than a predetermined threshold (200, for example) and generates a pixel specifying a value "0" when the luminance value is greater than the threshold. That is, pixels representing the background of the original are expressed by the value "0" while pixels representing non-background elements of the original are expressed by the value "1". Through this thresholding process, the CPU 32 generates bi-level image data configured of pixels, each pixel specifying the value "1" or "0". Hereinafter, a pixel specifying the value "1" will be called an ON pixel, while a pixel specifying the value "0" will be called an OFF pixel. FIG. 3 shows an example of a portion of a bi-level image 200 represented by bi-level image data generated in S14. In the bi-level image 200 shown in FIG. 3, ON pixels are depicted by filled cells, while OFF pixels are depicted by unfilled (white) cells.

In S16, the CPU 32 executes an isolated OFF pixel correction process on the bi-level image data generated in S14, thereby producing corrected image data. This process is performed to correct, to ON pixels, those OFF pixels that are contained in the bi-level image data as being isolated from other OFF pixels (hereinafter called "isolated OFF pixels"). FIG. 3 shows an example of a portion of a corrected image 300 represented by the corrected image data generated in S16. The corrected image 300 is obtained by correcting, to ON pixels, four isolated OFF pixels G1-G3 that are contained in a reference block 200a in the bi-level image 200. The isolated OFF pixels are defined as those OFF pixels that are entirely contained in the reference block in isolation from OFF pixels disposed outside the reference block. The OFF pixels disposed outside the reference block will be called also "outside OFF pixels" hereinafter. The reference block is a 3×3 pixel block of a rectangular shape, in which nine pixels are arranged in three rows and three columns such that three pixels are arranged in each row in the x-direction and three pixels are arranged in each column in the y-direction. As a variation, each of the number of pixels arranged in each row and the number of pixels arranged in each column may be two (2) or more than three (3). When executing this process on scan data obtained by reading an original at the reading resolution of 300 dpi, for example, the number of pixels constituting each row of the reference block may be nine (9), and the number of pixels constituting each column of the reference block may also be nine (9). Further, the number of pixels arranged in each row in the reference block (three, for example) may differ from the number of pixels arranged in each column in the reference block (four, for example). "OFF pixels contained in the reference block in isolation from OFF pixels outside the reference block" mentioned above signifies that OFF pixels in the reference block do not neighbor any OFF pixels outside the reference block and therefore are not connected with any OFF pixels outside the reference block. Note that when OFF pixels neighboring one another are contained in the reference block in isolation from outside OFF pixels, each of those OFF pixels inside the reference block is treated as an isolated OFF pixel. Here, examples of the pixels neighboring each other in the embodiment include: pixels that are disposed next to each other on the same row in the x-direction; and pixels that are disposed next to each other on the same column in the y-direction, but do not include pixels that are disposed on rows and columns different from each other. Accordingly, pixels that are disposed adjacent to each other in an intermediate direction between the x-direction and y-direction (i.e., a diagonal direction) are not an example of the pixels neighboring each other. However, according to a variation of the embodiment, examples of the pixels neighboring each other may include those pixels that are adjacent each other in diagonal directions.

In S18, the CPU 32 executes a decoding process on the barcode image included in the corrected image 300. The decoding process serves to identify a combination of characters, symbols, and the like based on the plurality of bars constituting the barcode image. Decoding can be performed using any of various known techniques. The process in FIG. 2 ends after the CPU 32 completes the process of S18.

Isolated OFF pixel correction process

Next, steps in the isolated OFF pixel correction process in S16 will be described with reference to FIG. 4.

Figure 4:
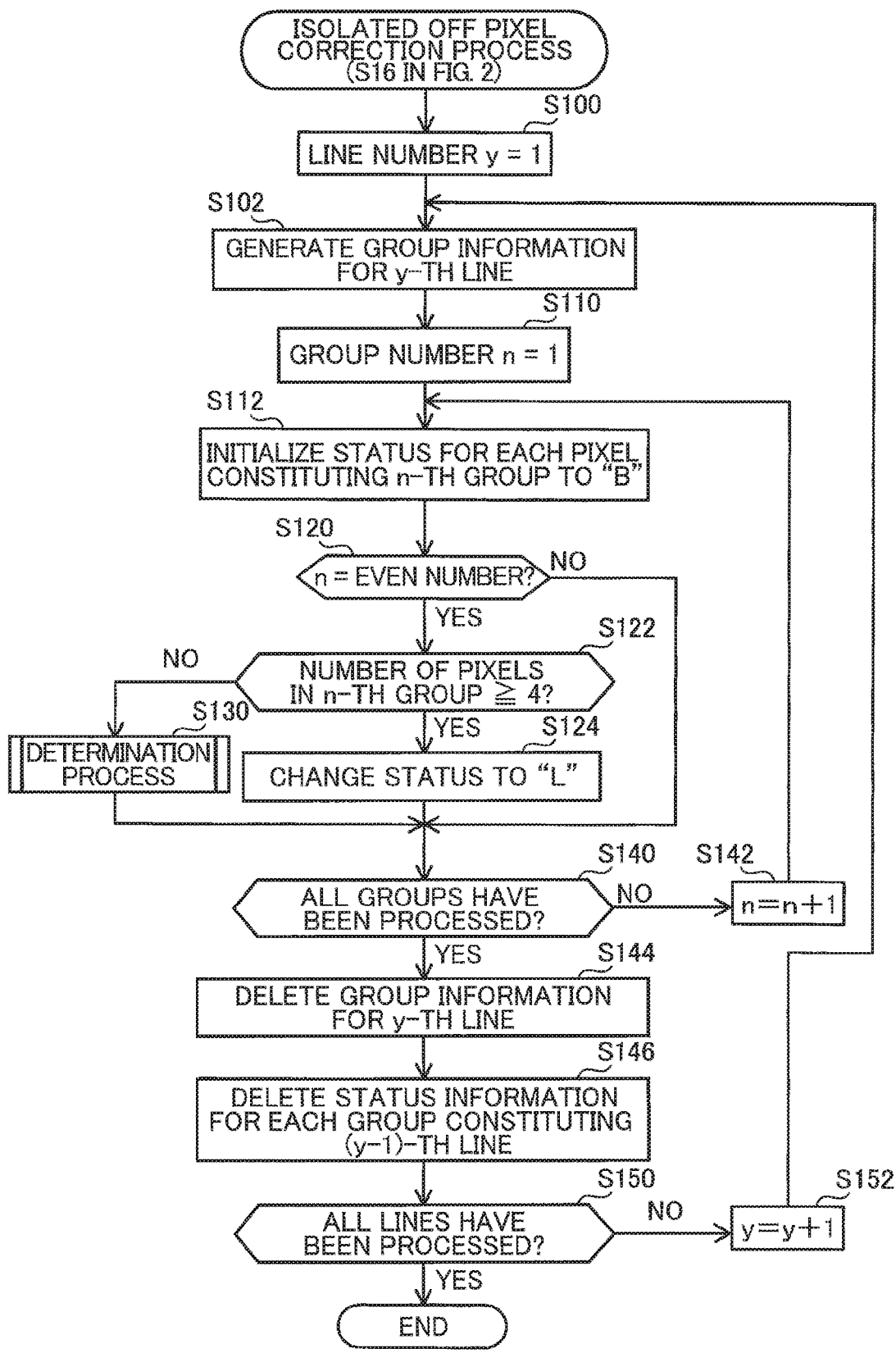
FIG. 4 is a flowchart of an isolated OFF pixel correction process shown in FIG. 2.

First, in S100 of FIG. 4, the CPU 32 sets the y coordinate for a target line to "1", in order to specify the y-th line (i.e., first line). A line is defined as being configured of a plurality of pixels aligned in the x-direction of the bi-level image. In the bi-level image 200 shown in FIG. 3, the y coordinate increases from top to bottom in the y-direction. In this case, the first line is the topmost line. Note that the x coordinate in the bi-level image 200 increases from left to right in the x-direction. As will be described later in greater detail, after completing the process in S102-S146 for the first line corresponding to y=1, the CPU 32 executes the same process on the second line corresponding to y=2, the third line corresponding to y=3, and so on in sequence (see S152). In other words, the CPU 32 sets each of the plurality of lines in the bi-level image 200 as the target line in order from top to bottom in the y-direction (S100, S152) and sequentially executes the process in S102-S146 on each specified line.

In S102, the CPU 32 generates group information for the y-th line based on the plurality of pixels in the y-th line, and writes the group information for the y-th line in a work area of the memory section 34. The work area is such an area in RAM that is used for temporarily storing information while executing processes. The group information for the y-th line is a string of numbers that specifies the sequence of ON pixels and OFF pixels in the y-th line. Specifically, the CPU 32 first writes the number of one or more ON pixels arranged continuously from the left end of the y-th line, then writes the number of one or more OFF pixels arranged continuously from the right end of the array of ON pixels, then writes the number of one or more ON pixels arranged continuously from the right end of the array of OFF pixels, and repeats this process as long as needed to write the group information. In the example of FIG. 3, the first line (y=1) in the bi-level image 200 is configured solely of thirty (30) ON pixels. Accordingly, the CPU 32 writes the numeric string "30" as group information 250 for the first line. The second line (y=2) in the bi-level image 200 is configured of four ON pixels, two OFF pixels G1, five ON pixels, five OFF pixels G4, seven ON pixels, one OFF pixel G5, and six ON pixels in order from left to right. Thus, the CPU 32 writes the numeric string "4, 2, 5, 5, 7, 1, 6" as the group information for the second line. If the pixel on the left end of the target line is an OFF pixel, the CPU 32 writes a number "0" as the leftmost number in the group information. If the target line is configured solely of thirty (30) OFF pixels, for example, the CPU 32 writes the numeric string "0, 30" as the group information for the target line.

In S110, the CPU 32 sets a group number "n" for a target group to "1", in order to specify the n-th group (i.e., first group). The group number "n" is assigned to each of the numbers constituting the numeric string in the group information generated in S102 in an ascending order beginning from the left, i.e., in the order "1", "2", "3", . . . . Hence, the group specified by group number "n" indicates a corresponding set of one or more continuous ON pixels or a corresponding set of one or more continuous OFF pixels in the y-th line. In the example of FIG. 3, as indicated by group information 250, the numeric string "30" is stored as group information for the first line. In this case, it is known that the first (n=1) group (i.e., the number "30") is configured from thirty continuous ON pixels. For the second line, the numeric string "4, 2, 5, 5, 7, 1, 6" is stored as the group information. In this case, it is known that the first (n=1) group (i.e., the number "4") is configured from four continuous ON pixels from the left end of the second line, and the second (n=2) group (i.e., the number "2") is configured from the two continuous OFF pixels G1 beginning from the right end of the four ON pixels.

Figure 6:
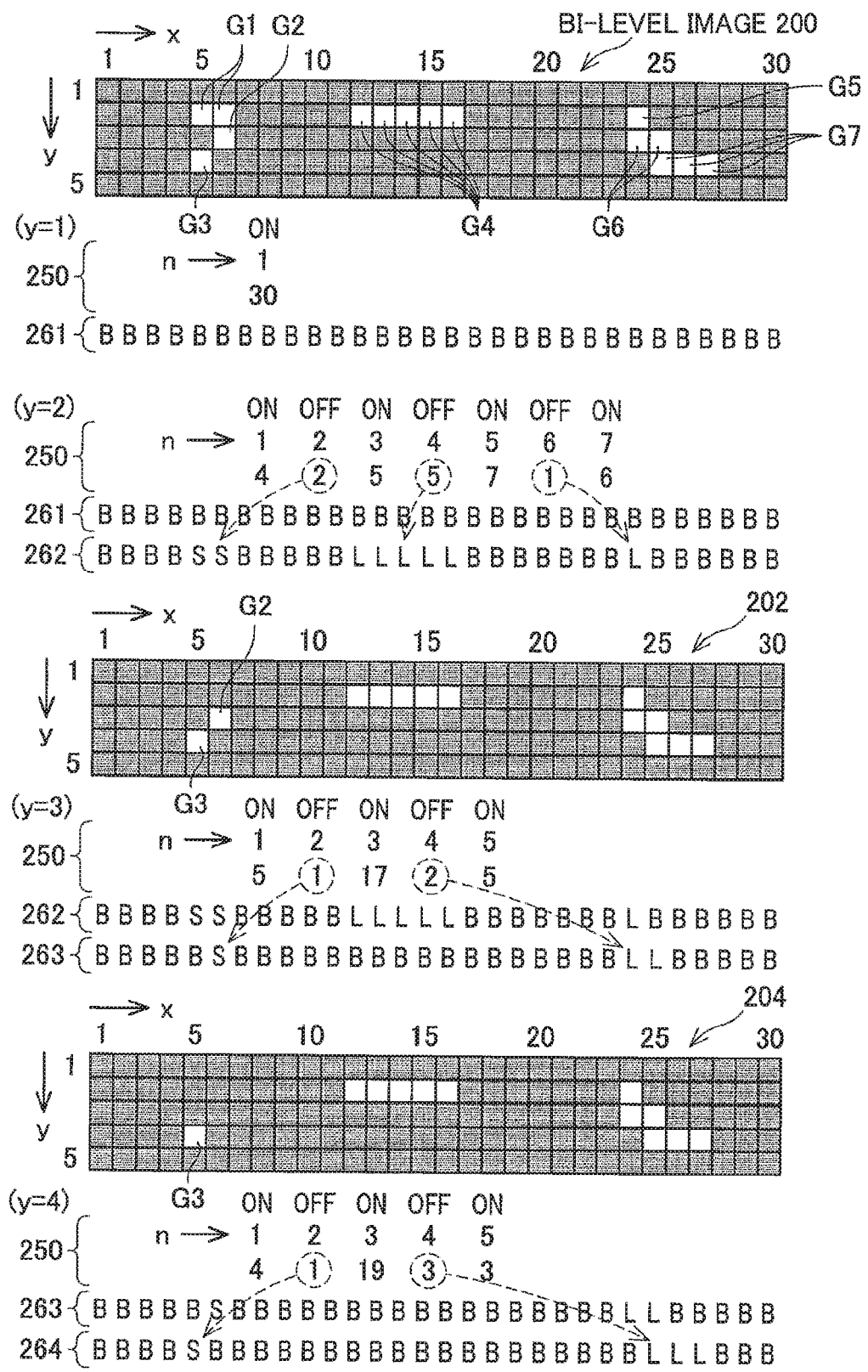
FIG. 6 illustrates how to determine the status of each pixel in each group defined on each pixel line.

In S112 the CPU 32 writes an initial value "B" in the work area as the status for each pixel constituting the n-th group. The status "B" indicates that the corresponding pixel is an ON pixel. For example, as shown in FIG. 6, the group information 250 for the first line in the bi-level image 200 includes the number "30" specifying the first group. Thus, in S112 the CPU 32 generates status information 261, in which the initial value "B" is written as the status for each of the thirty ON pixels, as illustrated in FIG. 6. It is noted that the status of each pixel can be set to not only the status "B" but also a status "L" and a status "S". The status "S" indicates that the corresponding pixel is such an isolated OFF pixel that is contained in the reference block in isolation from the OFF pixels outside the reference block. The status "L" indicates that the corresponding pixel is not an isolated OFF pixel, but is disposed relative to the reference block in connection with the OFF pixels outside the reference block.

In S120 the CPU 32 determines whether the current group number "n" is an even number. When "n" is even (S120: YES), the CPU 32 advances to S122. On the other hand, when "n" is odd (S120: NO), the CPU 32 skips S122-S130 to advance directly to S140. Note that skipping S122-S130 results in that the status of pixels in the n-th group is finalized as the status "B" which has been stored in S112.

In S122, the CPU 32 determines whether the number of pixels in the n-th group is greater than or equal to the threshold "four (4)". The threshold "four (4)" is determined by adding one (1) to the number of pixels existing in each row of the reference block aligned in the x-direction (3, in this example). The CPU 32 advances to S124 when the number of pixels in the n-th group is greater than or equal to the threshold "four (4)" (S122: YES), and advances to S130 when the number of pixels in the n-th group is less than the threshold "four (4)" (S122: NO).

In S124, the CPU 32 modifies the status for the n-th group from the initial value "B" to "L". When the number of pixels in the n-th group is four (4) or greater, it is known that the n-th group has four or more continuous OFF pixels aligned in the x-direction, and therefore the entire part of the OFF pixels in the n-th group cannot be accommodated in the reference block. Consequently, the status "L" is stored as the status of the n-th group. As shown in the example of FIG. 6, in the status information 262 for the second line, "L" is written in place of the initial value "B" as the status for the five OFF pixels G4 in the bi-level image 200. After completing S124, the CPU 32 advances to S140.

In S130, the CPU 32 executes a determination process for determining the status of the n-th group and modifying the status of the n-th group into the determined status. Through this process, the status of the n-th group is modified from the initial value "B" to either "L" or "S". After completing S130 the CPU 32 advances to S140.

In S140, the CPU 32 determines whether the process in S112-S130 has been executed for all groups existing in the y-th line. When the CPU 32 determines that the process has not been executed for all groups (S140: NO), in S142 the CPU 32 increments the current group number "n" by one (1) and returns to S112. On the other hand, when the CPU 32 determines that the process has been completed for all groups (S140: YES), that is, when status information has been set for all groups in the y-th line, the CPU 32 advances to S144.

When the CPU 32 sets y to two (2) in S152 to be described later, for example, the CPU 32 generates status information for the second line. As shown in FIG. 6, the group information 250 for the second line includes the numeric string "4, 2, 5, 5, 7, 1, 6" specifying seven groups. Since the CPU 32 reaches a NO determination in S120 for the first group (i.e., number "4"), the CPU 32 maintains the initial value "B" as the status for each of the four ON pixels constituting the first group (see the status information 262). Similarly, since the CPU 32 reaches NO determinations in S120 for the third, fifth, and seventh groups (i.e., numbers "5", "7", and "6"), the CPU 32 maintains the initial value "B" as the status for pixels in each of these groups. However, the CPU 32 reaches a YES determination in S120 for the second group (i.e., number "2"). Since the number of pixels in this group is less than four (4) (S122: NO), in S130 the CPU 32 modifies the status of the two OFF pixels G1 in the group from the initial value "B" to "S" as will be described later. For the fourth group (i.e., number "5"), the CPU 32 reaches a YES determination in S122 and modifies the status for the five OFF pixels G4 in the group from the initial value "B" to "L". For the sixth group (i.e., number "1"), the CPU 32 reaches a YES determination in S120 and a NO determination in S122 and in S130 modifies the status for the OFF pixel G5 in this group from "B" to "L" as will be described later with reference to the Case F in FIG. 9. After setting the status for each pixel in all the seven groups in this way, the status information 262 for the second line is complete. The CPU 32 similarly generates status information 263 for the third line after setting y to three (3) in S152 to be described later, and generates status information 264 for the fourth line after setting y to four (4).

In S144, the CPU 32 deletes. from the work area, the group information for the y-th line which has been written in S102. In S146, the CPU 32 deletes, from the work area, the status information for the (y−1)-th line which has been written in S112, S124, and S130 while processing the (y−1)-th line. In this way, the CPU 32 can execute the processes in S102-S142 simply by allocating sufficient capacity in the work area for storing group information for the y-th line, status information for the (y−1)-th line, and status information for the y-th line. Thus, the CPU 32 can perform these processes with only a small memory capacity.

In S150, the CPU 32 determines whether the process in S102-S146 has been executed for all lines in the bi-level image data. When the CPU 32 determines that the process has not been executed for all lines (S150: NO), in S152 the CPU 32 increments the current line number "y" by one (1) to calculate the new line number y, in order to specify the next line, and returns to S102. On the other hand, when the CPU 32 determines that the process has been completed for all lines (S150: YES), i.e., when the entire corrected image data has been produced, the process in FIG. 4 ends.

Determination Process

Next, the determination process executed in S130 of FIG. 4 will be described with reference to FIG. 5. This process is performed to determine the status of the n-th group in the y-th line (i.e., the target group) and to modify the status of this group from the initial value "B" to the determined status, that is, either "L" or "S".

Figure 5:
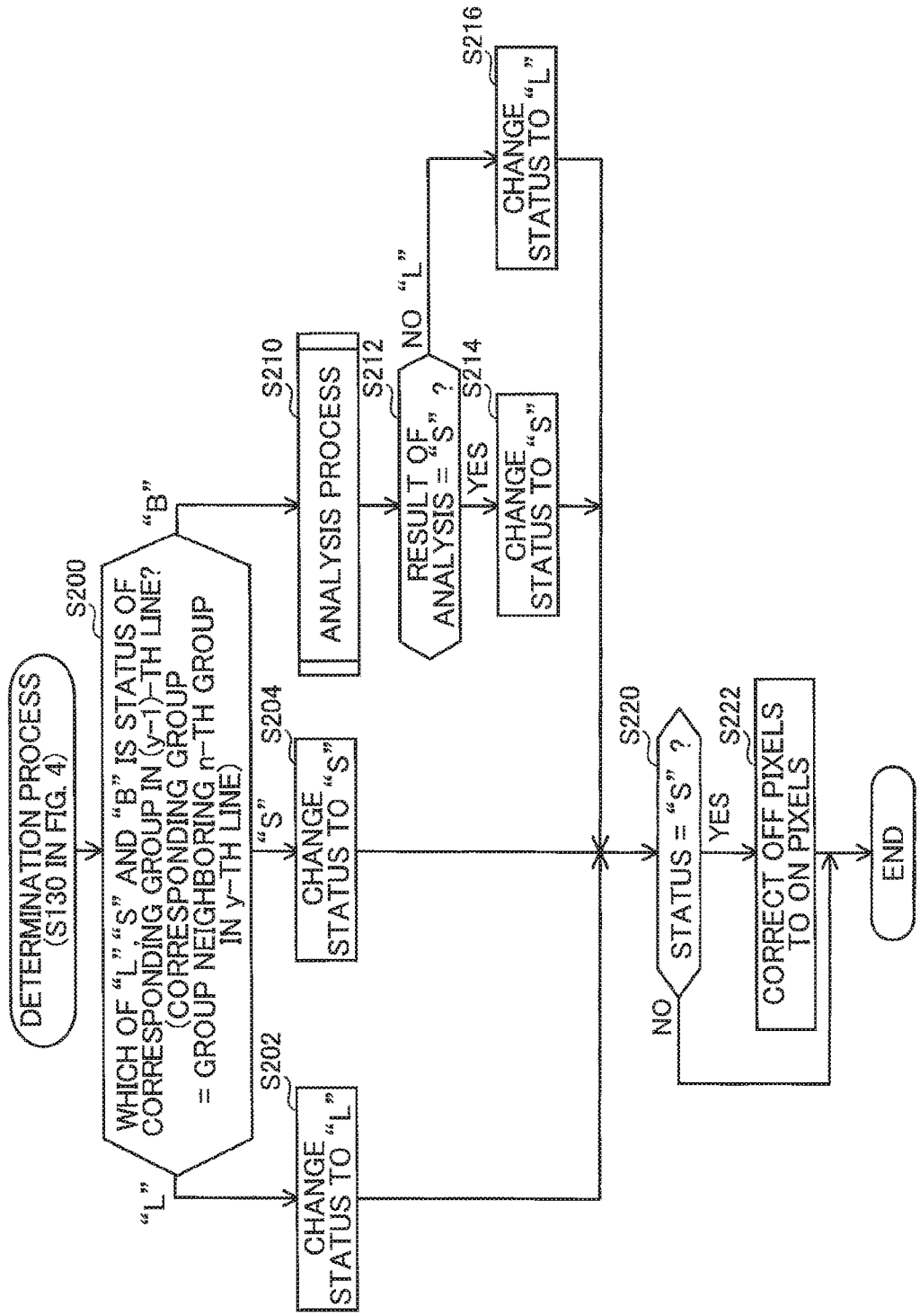
FIG. 5 is a flowchart of a determination process in FIG. 4.

First, in S200 of FIG. 5, the CPU 32 identifies the status of a corresponding group in the (y−1)-th line by using status information for the (y−1)-th line. The "corresponding group in the (y−1)-th line" is defined as a group that neighbors the n-th group in the y-th line (the target group). In this embodiment, a group in the (y−1)-th line is considered to neighbor the current group in the y-th line if at least one pixel in the group of the (y−1)-th line neighbors at least one pixel in the group of the y-th line. Note that if a group in the y-th line neighbors two or more groups in the (y−1)-th line, then a group configured of OFF pixels in the two or more groups is set as the corresponding group in the (y−1)-th line.

In the example of FIG. 6, the second group in the second line (i.e., the two OFF pixels G1) neighbors the first group in the first line (i.e., thirty ON pixels). Hence, the first group in the first line is set as the corresponding group in the (y−1)-th line, and the CPU 32 identifies the status "B" for the first group in the first line from the status information 261 for the first line. The second group in the third line (i.e., a single OFF pixel G2) neighbors the second group in the second line (i.e., the two OFF pixels G1). Hence, the second group in the second line is set as the corresponding group in the (y−1)-th line, and the CPU 32 identifies the status "S" for the second group in the second line from the status information 262 for the second line. Similarly, the fourth group in the third line (i.e., two OFF pixels G6) neighbors both of the sixth group in the second line (i.e., the single OFF pixel G5) and the seventh group in the second line (i.e., six ON pixels). Hence, the sixth group in the second line is set as the corresponding group in the (y−1)-th line, and the CPU 32 identifies the status "L" for the sixth group in the second line from the status information 262 for the second line.

When the CPU 32 identifies "L" as the status of the corresponding group in the (y−1)-th line (S200: L), in S202 the CPU 32 changes the status of the target group from "B" to "L" because the status "L" for the corresponding group in the (y−1)-th line signifies that mutually-neighboring OFF pixels including the OFF pixels constituting the corresponding group in the (y−1)-th line are not accommodated in the reference block, but protrude beyond the edges of the reference block. It is therefore known that mutually-neighboring OFF pixels including OFF pixels constituting the combination of the corresponding group in the (y−1)-th line and the target group in the y-th line are also not accommodated in the reference block but protrude beyond the edges of the reference block. Therefore, in S202 the CPU 32 stores "L" as the status for the target group. After completing S202 the CPU 32 advances to S220.

On the other hand, when the CPU 32 identifies "S" as the status of the corresponding group in the (y−1)-th line (S200: "S"), in S204 the CPU 32 changes the status of the target group from "B" to "S". Here, a status of "S" for the corresponding group in the (y−1)-th line signifies that the result of an analysis process executed on the corresponding group in the (y−1)-th line in S210 to be described later indicates that mutually-neighboring OFF pixels including OFF pixels constituting the combination of the corresponding group in the (y−1)-th line and the target group in the y-th line are accommodated in the reference block in isolation from OFF pixels outside the reference block. Therefore, in S204 the CPU 32 stores "S" as the status for the target group. After completing S204, the CPU 32 advances to S220.

As described above, when the status for the corresponding group in the (y−1)-th line is identified as "L" or "S" in S200, the CPU 32 advances to S220, without performing the analysis process on the target group in S210. Accordingly, the CPU 32 can rapidly set the status for the target group.

When the CPU 32 identifies the status for the corresponding group in the (y−1)-th line as "B" (S200: B), in S210 the CPU 32 executes the analysis process on the target group to analyze the status of the target group by using the reference block. In S212, the CPU 32 determines whether the result of the analysis process is "S" or "L". When the CPU 32 determines that the analysis result is "S" (S212: YES), in S214 the CPU 32 changes the status for the target group from the initial value "B" to "S". When the CPU 32 determines that the analysis result is "L" (S212: NO), in S216 the CPU 32 changes the status for the target group from the initial value "B" to "L". After completing S214 or S216, the CPU 32 advances to S220.

In S220 the CPU 32 determines whether the status for the target group is "S". When the CPU 32 determines that the status for the target group is "S" (S220: YES), in S222 the CPU 32 corrects (i.e., changes) all of the OFF pixels constituting the target group to ON pixels, and subsequently ends the process of FIG. 5. On the other hand, when the CPU 32 determines that the status for the target group is "L"

(S220: NO), the CPU 32 ends the process of FIG. 5 without executing the correction step in S222.

In the example shown in FIG. 6, the status for the second group on the second line in the bi-level image 200 (i.e., the two OFF pixels G1) is "S". Accordingly, the CPU 32 corrects each of the two OFF pixels G1 to an ON pixel, thereby producing a corrected image 202. Further, since the status of the second group on the third line in the corrected image 202 (i.e., the single OFF pixel G2) is "S", the CPU 32 corrects the single OFF pixel G2 to an ON pixel, thereby producing a corrected image 204. Similarly, since the status of the second group on the fourth line in the corrected image 204 (i.e., a single OFF pixel G3) is "S", the CPU 32 corrects the single OFF pixel G3 to an ON pixel, although not illustrated in the drawings.

Analysis Process

Next, steps in the analysis process executed in S210 of FIG. 5 will be described with reference to FIG. 7. The analysis process is performed to determine whether the target group is contained in a reference block in isolation from OFF pixels outside the reference block.

Before describing the process in FIG. 7, the contents of the analysis table 38 (see FIG. 1) will be described with reference to FIG. 8. In FIG. 8, reference numeral 400 designates a 3×3 pixel block, in which nine pixels are arranged in three rows and three columns, each row extending in the leftward/rightward direction (i.e., the x-direction) and each column extending in the upward/downward direction (i.e., in the y-direction). In each row, three pixels are aligned in the x-direction, and in each column, three pixels are aligned in the y-direction. Reference numeral 404 shows the same square pixel block, in which each of the nine pixels are assigned to either a value "1" or "0", where "1" represents an ON pixel and "0" represents an OFF pixel. From among the nine numbers, by arranging the three numbers "1, 0, 0" in the top row, the three numbers "1, 1, 0" in the middle row, and the three numbers "1, 0, 1" in the bottom row in this order, a binary number "100110101" in nine bits can be obtained. Hereinafter, a binary value representing the pattern of ON pixels and OFF pixels among the nine pixels in the pixel block will be called the "reference value (2)". When a reference value (2) is converted to a decimal number, the result is a reference value (10) represented in decimal. The value "309" is found as the reference value (10) for the nine pixels in the pixel block 400.

Further, the nine pixels in the pixel block 400 have eight edge pixels constituting the outer edge of the pixel block. The eight edge pixels include four ON pixels G0 and four OFF pixels G1-G3 in this example. In the analysis process of FIG. 7, the CPU 32 analyzes the reference block to determine whether the target group (i.e., one or more OFF pixels) is contained in the reference block in isolation from OFF pixels outside the reference block. In other words, the CPU 32 determines whether the OFF pixels among the eight edge pixels in the reference block neighbor OFF pixels outside the reference block (hereinafter, this determination will be called the "neighboring determination"). Here, each of the eight edge pixels can be assigned either a value "1" indicating that the pixel needs to be subjected to the neighboring determination, or a value "0" indicating that the pixel does not need to be subjected to the neighboring determination. For example, as shown in FIG. 8, in the pixel block 402, among the eight edge pixels G0, G1, G2, and G3, the value "1" is assigned to the OFF pixel G2, while the values "0" are assigned to the remaining seven edge pixels G0, G1, and G3. Note that each pixel constituting a corner of the pixel block is assigned two values, including a value indicating whether the neighboring determination needs to be executed in the upward/downward direction and a value indicating whether the neighboring determination needs to be executed in the leftward/rightward direction. More specifically, a pixel constituting an upper right corner of the pixel block is assigned two values, including a value indicating whether the neighboring determination needs to be executed in the upward direction and a value indicating whether the neighboring determination needs to be executed in the rightward direction. A pixel constituting a lower right corner of the pixel block is assigned two values, including a value indicating whether the neighboring determination needs to be executed in the downward direction and a value indicating whether the neighboring determination needs to be executed in the rightward direction. A pixel constituting a lower left corner of the pixel block is assigned two values, including a value indicating whether the neighboring determination needs to be executed in the downward direction and a value indicating whether the neighboring determination needs to be executed in the leftward direction. A pixel constituting an upper left corner of the pixel block is assigned two values, including a value indicating whether the neighboring determination needs to be executed in the upward direction and a value indicating whether the neighboring determination needs to be executed in the leftward direction. Hence, twelve values are assigned to the eight edge pixels. By arranging these twelve values in the sequence specified by the dashed arrow around the pixel block 402, a binary value "000000010000" can be obtained. In the following description, this binary representation of the twelve values indicating whether the neighboring determination needs to be executed will be called a "flag value (2)". Converting the flag value (2) to a decimal number produces a flag value (10) expressed in decimal. Thus, the value "16" is obtained as the flag value (10) for the nine pixels in the pixel block 400.

Similarly, for the nine pixels in another pixel block 410 shown in FIG. 8, the value "439" is obtained as the reference value (10), and the value "16" is obtained as the flag value (10). For the nine pixels in still another pixel block 420 shown in FIG. 4, the value "358" is obtained as the reference value (10), and the value "112" is obtained as the flag value (10). For the nine pixels in another pixel block 430, the value "204" is obtained as the reference value (10), and the value "3296" is obtained as the flag value (10). The vendor of the scanner 50 calculates the reference values (10) and flag values (10) for various patterns of ON pixels and OFF pixels in the 3×3 pixel block as described above, and prepares the analysis table 38, in which reference values (10) and flag values (10) are associated with each other. When the user installs the driver program 36 on the PC 10, this analysis table 38 is stored in the memory section 34.

Next will be described how to set the flag value (2) in correspondence with each reference value (2). First, a value "0", indicating that neighboring determination does not need to be executed, is assigned to all of ON edge pixels that are among the eight edge pixels and are ON pixels. In the example of the pixel block 402, a value "0" for not executing the neighboring determination is assigned to each of the four ON pixels G0.

Figure 7:
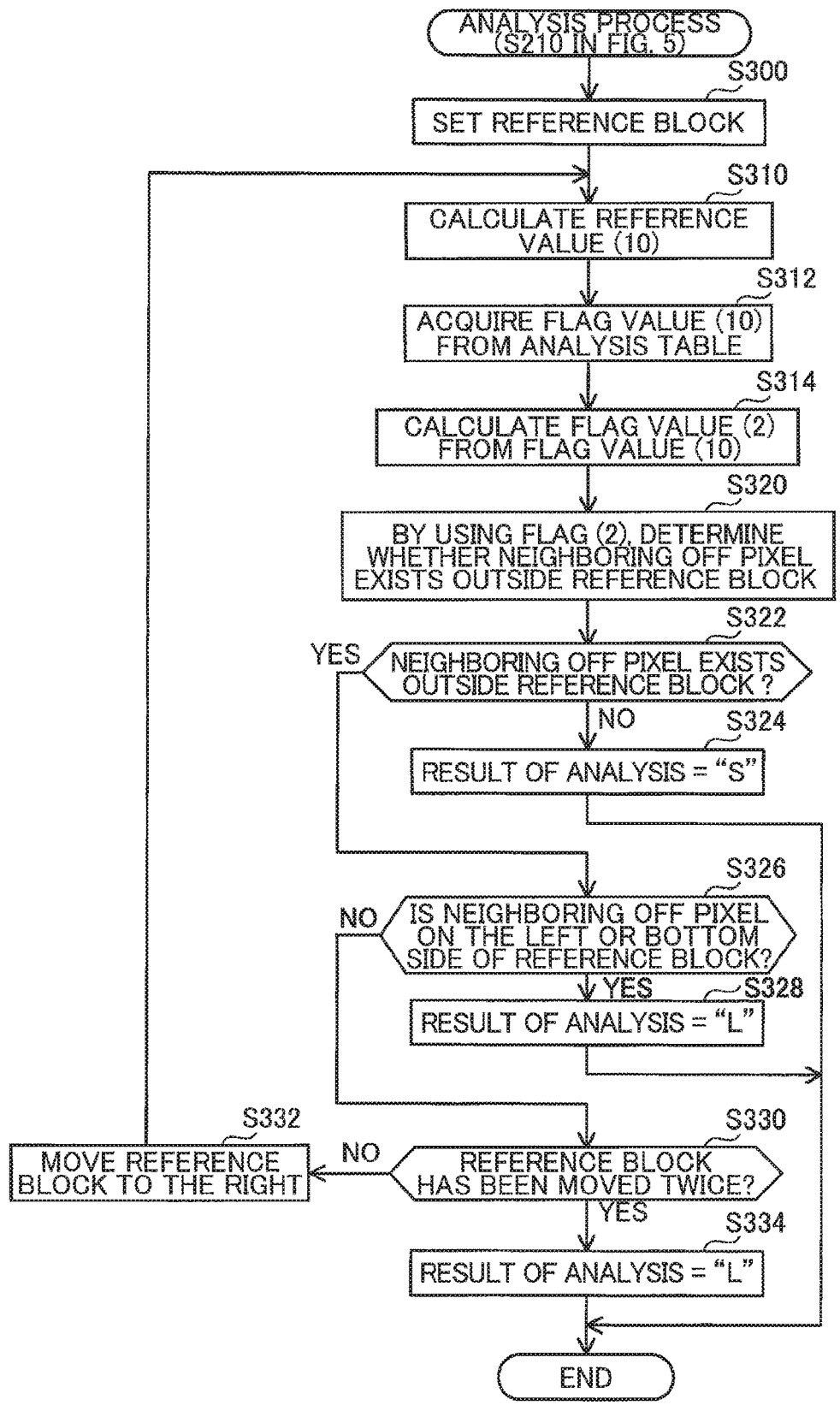
FIG. 7 is a flowchart of an analysis process in FIG. 5.
Figure 8:
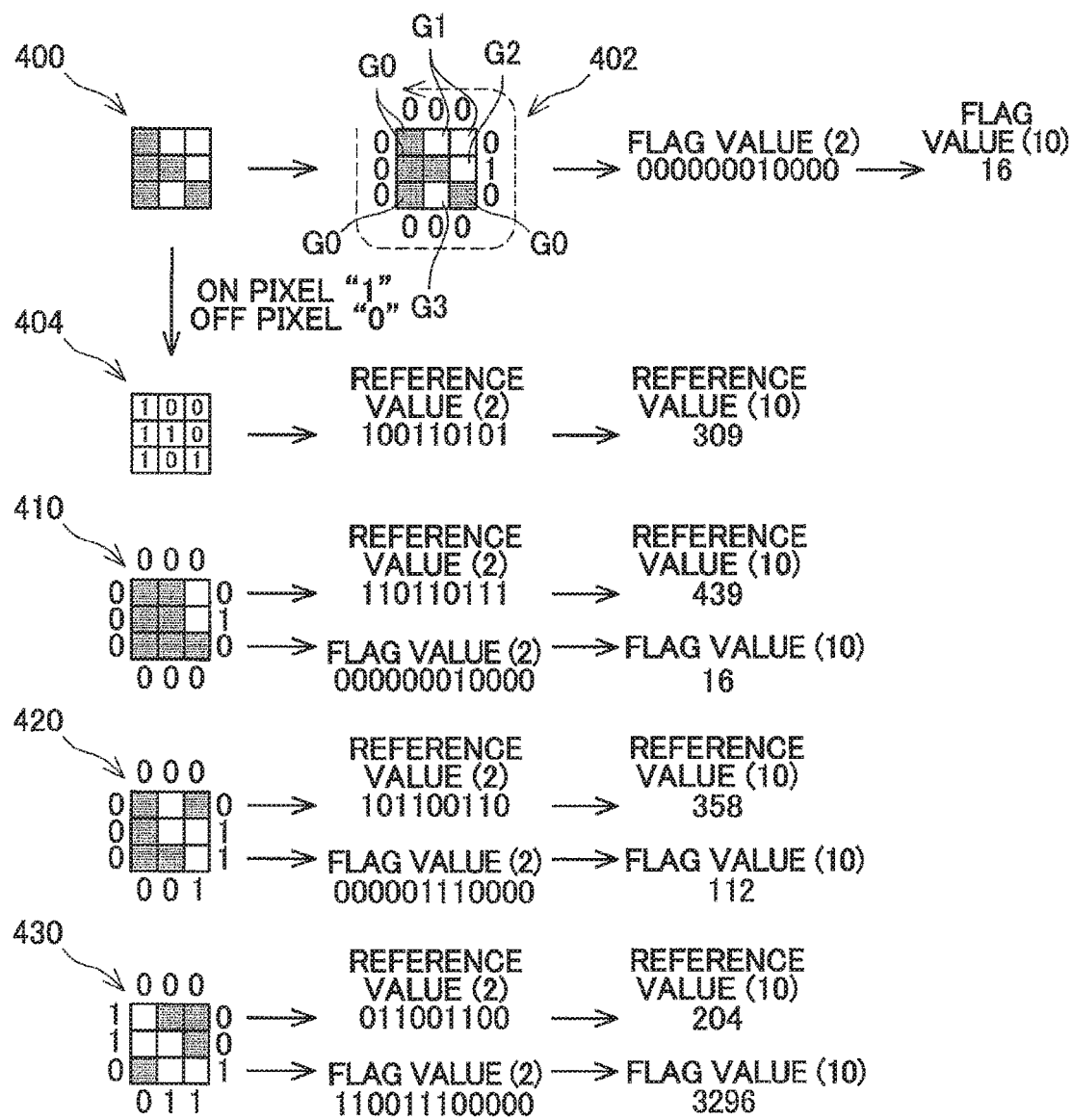
FIG. 8 shows an example of part of an analysis table, and illustrates how a reference value and a flag value are set for each of various pixel arrangement patterns.

In the embodiment, the reference block is set relative to the target image data such that a target group (i.e., one or more OFF pixels) is positioned in the top row in the square-shaped region of the reference block (see S300 of FIG. 7). For example, when the target group is the two OFF pixels G1 as shown in FIG. 6, the CPU 32 sets the reference block so that the two OFF pixels G1 are arranged in the top row of the block, as in the example of the pixel block 402. It is known that there are only ON pixels that neighbor the target group from above (S200 of FIG. 5: B). Therefore, a value "0" is assigned to each of the first through third bits in the twelve bits of the flag value (2), indicating that each pixel disposed on the top row of the reference block does not need to be subjected to the neighboring determination in the upward direction. For example, when ON and OFF pixels are arranged in the reference block similarly to that in the pixel block 402 shown in FIG. 8, the value "0" is set to the second and third bits in the flag value (2), indicating that the two pixels G1 do not need to be subjected to the neighboring determination in the upward direction, even though the two pixels G1 are OFF.

Further, the CPU 32 sets the reference block relative to the target image data such that an OFF pixel disposed at the right end of the target group (i.e., one or more OFF pixels) is positioned in the upper right corner of the reference block (see S300 of FIG. 7). When the target group is configured from the two OFF pixels G1, for example, the CPU 32 sets the reference block relative to the target image data so that the right-side OFF pixel among the two OFF pixels G1 is disposed in the upper right corner of the reference block, as a result of which the reference block has the same pattern as that of the pixel block 402. It is known that an ON pixel is disposed rightward of the right end of the target group (i.e., one or more OFF pixels) on the same y-th line. In other words, it is known that the OFF pixel in the upper right corner of the reference block neighbors an ON pixel that is disposed in the rightward direction. Accordingly, a value "0" is set in the fourth bit, indicating that the pixel in upper right corner of the reference block does not need to be subjected to the neighboring determination in the rightward direction, even when the pixel in upper right corner is OFF.

In the process of FIG. 7, it is determined whether two or more mutually-neighboring OFF pixels, including the target group (one or more OFF pixels), are contained in the reference block in isolation from the OFF pixels outside the reference block. There is such a case that an OFF pixel exists in the reference block on its outer edge at a position separate from the two or more neighboring OFF pixels (which will be referred to as "non-neighboring OFF pixel" hereinafter). In such a case, the neighboring determination does not need to be executed on the non-neighboring OFF pixel. For example, when the target group is configured from the two OFF pixels G1 and the reference block is set relative to the target image data to have the same pattern as the pixel block 402, the OFF pixel G2 needs to be subjected to the neighboring determination in the rightward direction, in order to determine whether neighboring OFF pixels, configured from the two OFF pixels G1 and the OFF pixel G2, are contained in the reference block in isolation from outside OFF pixels. However, the neighboring determination need not be executed on the OFF pixel G3 that does not neighbor the three OFF pixels G1 and G2. Accordingly, the value "0" is assigned to the eighth bit in the flag value (2), indicating that the OFF pixel G3 need not be subjected to the neighboring determination in the downward direction. It is noted that the OFF pixel G3 is treated not neighboring the OFF pixel G2, although the OFF pixel G3 neighbors the OFF pixel G2 in a diagonal direction. Accordingly, even though OFF pixels neighbor each other in the diagonal directions, as in the bi-level image 114 shown in FIG. 1, those OFF pixels can be treated as isolated OFF pixels, and properly corrected to ON pixels.

As described above, the first through fourth bits among the twelve bits in the flag value (2) are always set to "0", regardless of whether the pixels in the top row of the reference block are ON or OFF. Each of the fifth through twelfth bits of the flag value (2) is set with the value "0" if an ON pixel or a non-neighboring Off pixel is disposed at the corresponding location in the reference block. Each of the fifth through twelfth bits in the flag value (2) is set with the value "1" if an OFF pixel that neighbors one or more other OFF pixel containing the target group is disposed at the corresponding location in the reference block. When the reference block has the same pattern as the pixel block 402, for example, the fifth bit in the flag value (2) is set with the value "1", indicating that the OFF pixel G2 that neighbors the two OFF pixels G1 needs to be subjected to the neighboring determination in the rightward direction.

In S300 of FIG. 7, the CPU 32 sets a reference block such that the reference block includes the target group. Specifically, the reference block is set in S300 so that the OFF pixel disposed at the right end of the target group is positioned in the upper right corner of the reference block.

In S310 the CPU 32 calculates the reference value (10) representing the pattern of ON pixels and OFF pixels in the reference block. For example, when the reference block has the same pixel pattern as the pixel block 402 in FIG. 8, the CPU 32 identifies the value "100110101" as the reference value (2), and converts the reference value (2) to a decimal value to find the reference value (10). Here, the CPU 32 calculates the value "309" as the reference value (10).

In S312, the CPU 32 refers to the analysis table 38 in the memory section 34 to find a flag value (10) that is associated with the reference value (10) calculated in S310, thereby identifying the flag value (10). For example, when the CPU 32 calculates the value "309" as the reference value (10) in S310, the CPU 32 identifies the value "16" as the flag value (10) (see the analysis table 38 in FIG. 8).

In S314 the CPU 32 calculates the flag value (2) by converting the flag value (10) identified in S312 to a binary value. For example, when the CPU 32 obtains the value "16" as the flag value (10) in S312, in S314 the CPU 32 calculates the value "000000010000" as the flag value (2).

In S320 the CPU 32 executes the neighboring determination on one or more OFF pixels in the reference block that are indicated by the flag value (2) calculated in S314 as those pixels that need to be subjected to the neighboring determination. When the reference block has the same pattern as the pixel block 402 of FIG. 8, in S314 the CPU 32 calculates the value "000000010000" as the flag value (2) and in S320 executes a neighboring determination on the OFF pixel G2 in the rightward direction.

In S322 the CPU 32 confirms whether a neighboring OFF pixel has been found in any of the neighboring determinations executed in S320. In other words, the CPU 32 confirms whether a neighboring OFF pixel, which neighbors an OFF pixel inside the reference block, has been found outside the reference block through the neighboring determinations executed in S320. The CPU 32 advances to S324 when no neighboring OFF pixels have been found outside the reference block in the neighboring determinations (S322: NO), and advances to S326 when a neighboring OFF pixel has been found outside the reference block in any of the neighboring determinations (S322: YES).

FIG. 9 shows various cases in which the neighboring determination is executed. In each case, the reference block is depicted by a bold-lined square. In the example of Case A, the CPU 32 finds no neighboring OFF pixels outside the reference block (S322: NO), and in S324 sets the analysis result to "S". After completing S324, the CPU 32 ends the process of FIG. 7.

On the other hand, in each of Cases B-F in FIG. 9, the CPU 32 determines that a neighboring OFF pixel exists outside the reference block (S322: YES), and in S326 determines whether the neighboring OFF pixel is disposed outside the reference block on the left side or the bottom side of the reference block. In each of Cases B-F, an OFF pixel outside the reference block that neighbors an OFF pixel inside the reference block is indicated by a circle mark. The neighboring OFF pixel outside the reference block is on the left side of the reference block in Case B and beneath the reference block in Case C. In these cases, the CPU 32 reaches a YES determination in S326 and in S328 sets the analysis result to "L". As described above, the CPU 32 sets the reference block such that the OFF pixel constituting the right end of the target group is positioned in the upper right corner of the reference block. Therefore, when an OFF pixel inside the reference block neighbors an OFF pixel that is outside the reference block on the left or bottom side of the reference block, even if the reference block were shifted leftward or downward, the entirety of the mutually-neighboring OFF pixels cannot be accommodated in the reference block, but will still protrude beyond the boundary of the reference block. For example, if the reference block were shifted leftward one pixel in Case B, the nine neighboring OFF pixels would still not be contained entirely in the reference block, but would protrude beyond the right edge of the reference block in the rightward direction. Similarly, if the reference block were shifted downward one pixel in Case C, the four neighboring OFF pixels would still not be contained entirely in the reference block, but would protrude upwardly beyond the upper edge of the reference block. Therefore, when an OFF pixel outside of the reference block on the left side or the bottom side thereof neighbors an OFF pixel inside the reference block (S326: YES), in S328 the CPU 32 sets the analysis result to "L" without moving the reference block. After completing S328, the CPU 32 ends the process of FIG. 7.

In Cases D-F of FIG. 9, a pixel inside the reference block neighbors an OFF pixel outside the reference block on the right side thereof. In these cases, the CPU 32 reaches a NO determination in S326 and in S330 determines whether the reference block has been shifted twice. Here, twice is the value obtained by subtracting one (1) from the number of pixels arranged in each row of the reference block in the x-direction (three (3) in this example). When the CPU 32 determines that the reference block has not been shifted twice (S330: NO), in S332 the CPU 32 shifts the reference block to the right by the one pixel's worth of distance and repeats the process in S310-S330. In Case D of FIG. 9, for example, when the process in S310-S330 is performed for the first time, the CPU 32 determines that an OFF pixel inside the reference block neighbors an OFF pixel outside the reference block on the right side thereof (S326: NO). Accordingly, the CPU 32 shifts the reference block to the right and executes the analysis process again (second time). When the analysis process is performed for the second time, the CPU 32 determines that an OFF pixel inside the reference block neighbors an OFF pixel outside the reference block on the left side thereof (S326: YES). Accordingly, in S328 the CPU 32 sets the analysis result to "L". In Case E, when the analysis process is performed for the second time, the CPU 32 determines that no neighboring OFF pixels exist outside the reference block (S322: NO) and in S324 sets the analysis result to "S".

In Case F, when the analysis process is performed for the second time, the CPU 32 determines that an OFF pixel inside the reference block neighbors an OFF pixel outside the reference block on the right side thereof (S326: NO). Accordingly, the CPU 32 shifts the reference block further to the right by the one pixel's worth of distance and executes the analysis process again (third time). When the analysis process is performed for the third time, the CPU 32 determines that a neighboring OFF pixel is still present on the right side of the reference block (S326: NO) and determines that the reference block has been moved twice (S330: YES). Accordingly, in S334 the CPU 32 sets the analysis result to "L" without shifting the reference block further to the right. This is because it is now known that even if the reference block were shifted further to the right, six neighboring OFF pixels will not be contained in the reference block, but will extend beyond the left edge of the reference block in the leftward direction. After completing S334, the CPU 32 ends the process of FIG. 7.

Effects of the Embodiment

In the embodiment described above, the analysis table 38 that correlates reference values (10) with flag values (10) is stored in the memory section 34. The PC 10 can use the flag value (10) corresponding to the pattern of ON pixels and OFF pixels in the reference block to determine which OFF pixels in the reference block should be subjected to the neighboring determination (S320 of FIG. 7). Consequently, the PC 10 can avoid executing the neighboring determination on every OFF pixel constituting an edge of the reference block. Accordingly, the PC 10 can rapidly identify isolated OFF pixels and can rapidly correct these isolated OFF pixels to ON pixels.

Correspondences

The PC 10 is an example of the image analyzing apparatus. The x-direction and y-direction are examples of the first direction and second direction, respectively. The top edge and bottom edge are examples of the "upstream side edge in the second direction" and "downstream side edge in the second direction", respectively, and the left side edge and right side edge are "upstream side edge in the first direction" and "downstream side edge in the first direction", respectively. "3" is an example of the "M" and "N". OFF pixels and ON pixels are examples of pixels of the first type and pixels of the second type, respectively. The plurality of flag values (10) in the analysis table 38 is an example of the plurality of pieces of reference data. S310, S312, and S320 of FIGS. 7 and S222 of FIG. 5 are examples of "calculating a target reference value", "specifying a piece of reference data", "executing a reference-data-based judgement", and "executing a correction", respectively.

Figure 2:
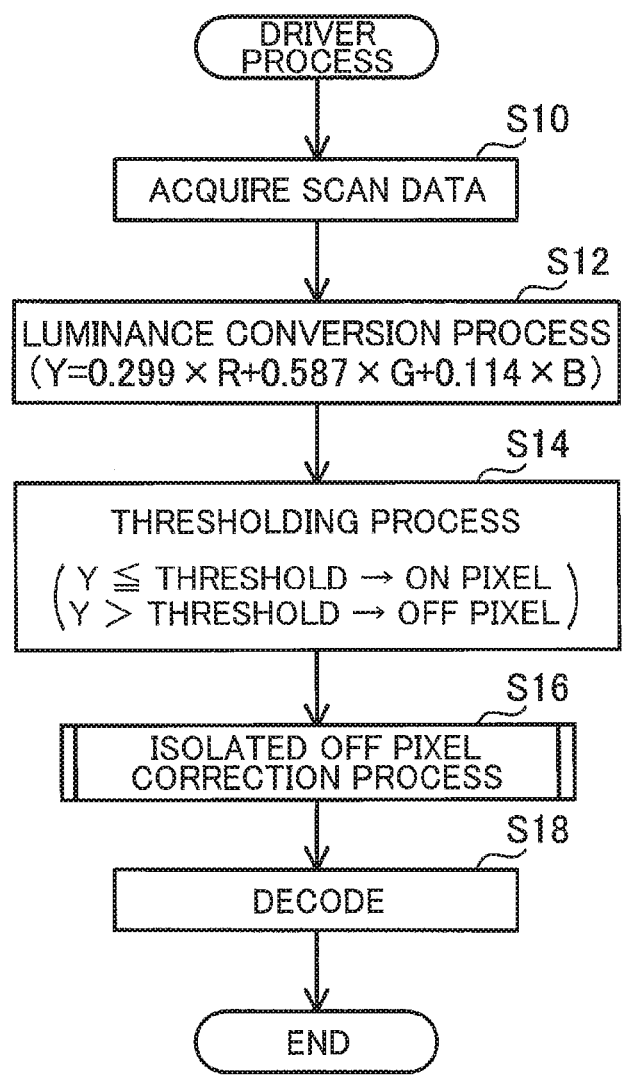
FIG. 2 is a flowchart of a driver process executed by the personal computer shown in FIG. 1.

The bi-level image data generated in S14 of FIG. 2 is an example of the "target image data". The nine pixels in the reference block are an example of the "target pixel block". The eight pixels disposed at an outer edge of each of the pixel blocks 400, 410, 420, and 430 in FIG. 8 are an example of the "L-number of edge pixels". L is a value dependent on M and N and, in general, is an integer that satisfies L=(2×M)+(2×N)−4. The one or more OFF pixels included in the three pixels, which are among the nine pixels and are disposed on the top row in the pixel block, are an example of the "m number of pixels". The three OFF pixels G1 and G2 in FIG. 9 are an example of "neighboring first-type pixels". The OFF pixel G3 is an example of a "non-neighboring first-type pixel". The OFF pixel disposed at the right end among the two OFF pixels G1 is an example of the "target pixel". The OFF pixel G2 is an example of "another target pixel". The nine pixels in the reference block of Case A in FIG. 9 is an example of the "first target pixel block". The OFF pixel in the reference block of Case C that neighbors the OFF pixel designated with the circle mark is an example of the "pixel of the first type disposed at the downstream side edge of the target pixel block in the second direction". The OFF pixel in the reference block of Case B that neighbors the OFF pixel designated with the circle mark is an example of the "pixel of the first type disposed at the upstream side edge of the target pixel block in the first direction". In Cases D and E, for the first time when the analysis process is performed and in Case F, for the first through third times the analysis process is performed, the OFF pixel in the reference block that neighbors the OFF pixel designated with the circle mark is an example of the "pixel of the first type disposed at the downstream side edge of the target pixel block in the first direction". The nine pixels in the reference block set in the analysis process executed at each of the second and third times in Cases D-F are examples of the "new target pixel group".

While the description has been made in detail with reference to the specific embodiment thereof, it would be apparent to those skilled in the art that various changes and modifications may be made therein without departing from the spirit and scope of the above described aspects.

(Variation 1) For example, the original to be read need not include a barcode therein. Assume now that scan data representing a bi-level image, which is configured of ON pixels and OFF pixels, is generated through a bi-level scan of an original. By executing the process of S16 in FIG. 2 on this scan data, the CPU 32 can correct, to ON pixels, those isolated OFF pixels representing unnecessary gaps generated in an object, such as a photograph or a text, thereby improving the quality of a resultant image. According to this variation, the scan data generated through the bi-level scan is an example of the target image data.

(Variation 2) The PC 10 may instead be configured to correct isolated ON pixels to OFF pixels. In this case, the analysis table 38 is prepared such that a flag value (10) is assigned to each of one or more ON pixels disposed at an outer edge of the reference block, thereby indicating whether the determination process needs to be executed to determine whether each of the ON pixel neighbors an ON pixel outside the reference block. This method can remove isolated ON pixels (i.e., isolated dots), resulting in improved image quality. In this variation, the ON pixels and OFF pixels are examples of pixels of the first type and pixels of the second type, respectively. This variation can be used to correct isolated ON pixels in scan data to pixels indicative of the background color when the scan data is multilevel RGB image data. In this case, the multilevel RGB image data is an example of the target image data.

(Variation 3) In the determination process of FIG. 5, steps S200, S202, and S204 may be omitted so that the analysis process of S210 is always executed. In other words, the CPU 32 may always set a reference block with respect to the n-th group on the y-th line such that one or more OFF pixels in the n-th group on the y-th line are disposed on the top edge of the reference block and the OFF pixel on the right end of the n-th group is positioned in the upper right corner of the reference block to execute the analysis process on the reference block, even though the status of each OFF pixel constituting the corresponding group in the (y−1)-th line is "L" or "S".

(Variation 4) In S300 of FIG. 7, the CPU 32 may set the reference block such that an OFF pixel constituting the left end of the target group is positioned in the upper left corner of the block, rather than setting the reference block such that an OFF pixel constituting the right end of the target group is positioned in the upper right corner of the block. In this variation, the CPU 32 determines in S326 whether the neighboring OFF pixel existing outside the reference block is disposed on the right side or the bottom side of the reference block, and in S332 shifts the reference block to the left. Further, while the CPU 32 selects each line sequentially from top to bottom in the y-direction in the embodiment, the CPU 32 may instead select each line sequentially from bottom to top in the y-direction. In this case, the reference block is set such that the target group is arranged in the bottom row of the block.

(Variation 5) The analysis table 38 may also be configured to store the reference values (2) and flag values (2) in association with each other for the various patterns of ON pixels and OFF pixels. In this variation, the reference values (2) and flag values (2) are examples of the reference values and the plurality of pieces of reference data, respectively.

(Variation 6) The scanner 50 may be configured to execute the processes in FIG. 2 and to transmit the decoding results to the PC 10 in S18. Hence, the image analyzing apparatus may be a scanner. Generally speaking, examples of the image analyzing apparatus include any apparatus that can analyze an image, such as a multifunction device, a smartphone, and the like.

(Variation 7) In the embodiment described above, the CPU 32 of the PC 10 implements the various process in FIGS. 2 through 9 by executing the driver program 36 (i.e., software). However, one or more of the processes in FIGS. 2 through 9 may instead be implemented in hardware, such as logic circuits.

What is claimed is:

1. An image analyzing apparatus comprising:
a memory that stores a plurality of pieces of reference data in correspondence with a plurality of pixel arrangement patterns, each pixel arrangement pattern being defined for a rectangular-shaped pixel block configured from (M×N) number of pixels arranged in N number of rows and M number of columns, each row extending in a first direction and each column extending in a second direction orthogonal to the first direction, wherein M and N are integers greater than or equal to two (2), the (M×N) number of pixels including L number of edge pixels disposed at an outer edge of the rectangular-shaped pixel block, wherein L is an integer satisfying an equation of L=(2×M)+(2×N)−4, each pixel arrangement pattern indicating how pixels of a first type and of a second type are arranged in the pixel block, the L number of edge pixels including at least one edge pixel of the first type, the piece of reference data for each pixel arrangement pattern indicating which of the edge pixels of the first type in the pixel block needs to be subjected to a determination to determine whether there exists an outside neighboring first-type pixel that is of the first type and is disposed outside the pixel block at a location adjacent to the edge pixel of the first type; and
a controller configured to perform:
acquiring target image data that is generated by reading an original, the target image data being configured from a plurality of pixels arranged in a plurality of rows and a plurality of columns, each row extending in the first direction and each column extending in the second direction;
specifying, in the target image data, a rectangular-shaped target pixel block configured from the (M×N) number of pixels arranged in the N number of rows and the M number of columns, each row extending in the first direction and each column extending in the second direction; and analyzing the target pixel block, the analyzing the target pixel block including:

specifying, as target reference data a piece of reference data that is among the plurality of pieces of reference data and that corresponds to a pixel arrangement pattern in the target pixel block;

executing a reference-data-based judgment on the target pixel block to perform the determination onto each of those edge pixels of the first type that are indicated by the target reference data as need to be subjected to the determination; and executing a correction on the target pixel block to correct the type of at least one pixel of the first type contained in the target pixel block into the second type in a case where a result of the executed reference-data-based judgment indicates that there exists no outside neighboring first-type pixel with respect to the target pixel block.

2. The image analyzing apparatus according to claim 1, wherein the specifying the target pixel block includes specifying each of a plurality of target pixel blocks in succession in the target image data, and wherein the analyzing the target pixel block includes analyzing each of the plurality of target pixel blocks in succession.

3. The image analyzing apparatus according to claim 2, wherein the memory stores, as one of the pixel arrangement patterns, a first pixel arrangement pattern that contains neighboring first-type pixels that are configured from at least two pixels of the first type, which are adjacent to one another and at least one pixel of which is disposed at the outer edge of the pixel block, wherein the memory stores a first piece of reference data in correspondence with the first pixel arrangement pattern, the first piece of reference data indicating that the determination needs to be executed on the at least one edge pixel among the neighboring first-type pixels, and wherein the memory stores, as one of the pixel arrangement patterns, a second pixel arrangement pattern that contains both of the neighboring first-type pixels and a non-neighboring first-type pixel, the non-neighboring first-type pixel being of the first type, disposed at the outer edge of the pixel block, and not neighboring any of the pixels in the neighboring first-type pixels, and wherein the memory stores a second piece of reference data in correspondence with the second pixel arrangement pattern, the second piece of reference data indicating that the determination needs to be executed on at least one pixel among the neighboring first-type pixels and the determination does not need to be executed on the non-neighboring first-type pixel.

4. The image analyzing apparatus according to claim 2, wherein pixels of the first type have luminance values greater than a prescribed threshold value, and pixels of the second type have luminance values smaller than or equal to the prescribed threshold value.

5. The image analyzing apparatus according to claim 1, wherein two pixels are determined to be adjacent to each other when the two pixels are disposed next to each other in the same row so as to be aligned in the first direction with no other pixels interposed therebetween and when the two pixels are disposed next to each other in the same column so as to be aligned in the second direction with no other pixels interposed therebetween, and wherein two pixels are determined not to be adjacent to each other when the two pixels are disposed at different rows and different columns so as to be aligned in a direction that is intermediate between the first direction and the second direction.

6. The image analyzing apparatus according to claim 1, wherein the target image data is comprised of a plurality of pixel lines, each pixel line being configured from a plurality of pixels arranged in the first direction, the plurality of pixel lines being arranged in the second direction, the plurality of pixel lines including an n-th pixel line and an (n+1)-th pixel line arranged in the second direction such that the (n+1)-th pixel line is disposed downstream from the n-th pixel line in the second direction and adjacent to the n-th pixel line in the second direction, in which n is an integer greater than or equal to one (1), wherein the outer edge of the pixel block has an upstream side edge and a downstream side edge that is disposed downstream from the upstream side edge in the second direction, wherein the controller is configured to further perform specifying each of the plurality of pixel lines in succession in the second direction, wherein in a first case where the n-th pixel line is specified and the n-th pixel line contains a target pixel of the first type, a first target pixel block containing the target pixel at the upstream side edge thereof is specified and analyzed, and wherein in a second case where the (n+1)-th pixel line is specified and the (n+1)-th pixel line contains another target pixel of the first type at a location adjacent to the target pixel, a second target pixel block containing the another target pixel at the upstream side edge thereof is not specified or analyzed.

7. The image analyzing apparatus according to claim 6, wherein the memory stores, in correspondence with a pixel arrangement pattern in which "m" number of pixels of the first type are disposed at the upstream side edge of the pixel block, a piece of reference data indicating that each pixel in the "m" number of pixels does not need to be subjected to an upstream-side determination, wherein "m" is an integer greater than or equal to one (1) and smaller than or equal to M, the upstream-side determination being configured to determine whether there exists the outside neighboring first-type pixel outside the pixel block at a location upstream from the upstream side edge of the pixel block in the second direction.

8. The image analyzing apparatus according to claim 6, wherein when the reference-data-based judgment executed on the first target pixel block indicates that no outside neighboring first-type pixel exists with respect to the first target pixel block, the type of the target pixel in the first target pixel block is corrected into the second type, and the type of the another target pixel in the second target pixel block is also corrected into the second type, although the second target pixel block is not specified or analyzed.

9. The image analyzing apparatus according to claim 1, wherein the outer edge of the pixel block has an upstream side edge and a downstream side edge disposed downstream from the upstream side edge in the second direction, wherein the target pixel block is specified in the target image data such that the target pixel block contains a pixel of the first type at the upstream side edge thereof, wherein the correction process is not executed onto the target pixel block when the following two conditions are met:

that at least one pixel disposed at the downstream side edge of the target pixel block is of the first type; and that the result of the reference-data-based judgment executed on the target pixel block indicates that at least one outside neighboring first-type pixel exists at a location downstream from the downstream side edge of the target pixel block in the second direction.

10. The image analyzing apparatus according to claim 1, wherein the outer edge of the pixel block has an upstream side edge and a downstream side edge disposed downstream from the upstream side edge in the first direction, wherein the target pixel block is specified in the target image data such that the target pixel block contains a pixel of the first type at the downstream side edge thereof, wherein the correction process is not executed onto the target pixel block when the following two conditions are met:

that at least one pixel disposed at the upstream side edge of the target pixel block is of the first type; and that the result of the reference-data-based judgment executed on the target pixel block indicates that at least one outside neighboring first-type pixel exists at a location upstream from the upstream side edge of the target pixel block in the first direction.

11. The image analyzing apparatus according to claim 1, wherein the outer edge of the pixel block has an upstream side edge and a downstream side edge disposed downstream from the upstream side edge in the first direction, and wherein the target pixel block is specified at an original position in the target image data such that at least one pixel, including a target pixel, disposed at the downstream side edge of the target pixel block is of the first type; and wherein in a case where at least one pixel disposed at the downstream side edge of the target pixel block is of the first type and the result of the reference-data-based judgment executed on the target pixel block indicates that at least one outside neighboring first-type pixel exists at a location downstream from the downstream side edge of the target pixel block in the first direction, the correction process is not executed on the target pixel block, and a new target pixel block is specified in the target image data at a position that is shifted from the original position by a one pixel worth of distance toward downstream in the first direction, and the new target pixel block is analyzed, and in a case where the reference-data-based judgment executed on the new target pixel block indicates that no outside neighboring first-type pixel exists with respect to the new target pixel block, the type of at least the target pixel that is now contained in the new target pixel block is corrected to the second type.

12. The image analyzing apparatus according to claim 1, wherein the memory stores, for each pixel arrangement pattern, a reference value and the piece of reference data in association with each other, the piece of reference data corresponding to the each pixel arrangement pattern, the reference value being determined by quantifying the each pixel arrangement pattern by using a prescribed rule, wherein the analyzing a target pixel block includes calculating a target reference value from the target pixel arrangement pattern by using the prescribed rule, and wherein the specifying a piece of reference data includes selecting, from among the plurality of pieces of reference data, a piece of reference data that is associated with the calculated target reference value.

13. A non-transitory computer readable storage medium storing a set of program instructions for an image analyzing apparatus, the image analyzing apparatus including a memory and a processor, the memory storing a plurality of pieces of reference data in correspondence with a plurality of pixel arrangement patterns, each pixel arrangement pattern being defined for a rectangular-shaped pixel block configured from (M×N) number of pixels arranged in N number of rows and M number of columns, each row extending in a first direction and each column extending in a second direction orthogonal to the first direction, wherein M and N are integers greater than or equal to two (2), the (M×N) number of pixels including L number of edge pixels disposed at an outer edge of the rectangular-shaped pixel block, wherein L is an integer satisfying an equation of $L=(2\times M)+(2\times N)-4$, each pixel arrangement pattern indicating how pixels of a first type and of a second type are arranged in the pixel block, the L number of edge pixels including at least one edge pixel of the first type, the piece of reference data for each pixel arrangement pattern indicating which of the edge pixels of the first type in the pixel block needs to be subjected to a determination to determine whether there exists an outside neighboring first-type pixel that is of the first type and is disposed outside the pixel block at a location adjacent to the edge pixel of the first type, the program instructions, when executed by the processor, causing the image analyzing apparatus to perform:

acquiring target image data that is generated by reading an original, the target image data being configured from a plurality of pixels arranged in a plurality of rows and a plurality of columns, each row extending in the first direction and each column extending in the second direction;

specifying, in the target image data, a rectangular-shaped target pixel block configured from the (M×N) number of pixels arranged in the N number of rows and the M number of columns, each row extending in the first direction and each column extending in the second direction; and analyzing the target pixel block, the analyzing the target pixel block including:

specifying, as target reference data, a piece of reference data that is among the plurality of pieces of reference data and that corresponds to a pixel arrangement pattern in the target pixel block;

executing a reference-data-based judgment on the target pixel block to perform the determination onto each of those edge pixels of the first type that are indicated by the target reference data as need to be subjected to the determination; and executing a correction on the target pixel block to correct the type of at least one pixel of the first type contained in the target pixel block into the second type in a case where a result of the executed reference-data-based judgment indicates that there exists no outside neighboring first-type pixel with respect to the target pixel block.

\* \* \* \* \*